United States Patent Office 3,193,473
Patented July 6, 1965

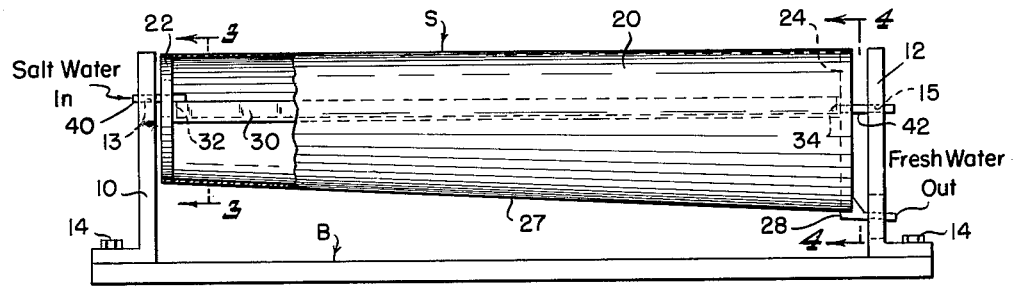

3,193,473
SOLAR STILL
Kim D. Beard, 1040 S. Magnolia, Los Angeles, Calif.
Filed Nov. 6, 1962, Ser. No. 235,724
3 Claims. (Cl. 202—234)

This invention relates to solar distillation apparatus for converting sea water into fresh water, and relates particularly to a portable solar still assembly.

In many areas, such as in underdeveloped countries, or in isolated vacation areas, there is a need for an inexpensive, portable, easily assembled and durable, solar distillation apparatus which can be used by persons not having particular mechanical skill or having tools at their disposal.

Accordingly, one of the objects of my invention is to provide a solar still of simple construction which can be readily assembled by the user in isolated areas adjacent a source of salt water where power is either expensive or unavailable.

Another object of my invention is to provide a solar still of light weight, having few parts and which is compact when disassembled and which can be assembled without requiring tools.

A still further object of my invention is to provide a combination of the basic elements of the apparatus so that a simple assembly is utilized, and which is characterized by a means of readily assembling and supporting the entire assembly.

A still further object of my invention is to provide a distillation apparatus which is efficient and does not tend to accumulate mineral deposits.

Other objects and advantages of my invention will become apparent to those skilled in the art from the following description of my invention.

Referring particularly to the drawings:

FIGURE 1 shows a side elevational view of my device with a portion cut away to illustrate the interior arrangement of the parts.

FIGURE 2 is a top plan view of my invention with a portion cut away to show the relative arrangement of the parts.

FIGURE 3 is a sectional view taken along the lines 3—3 of FIGURE 1 which further illustrates the interior arrangement of my device.

FIGURE 4 is an end view of the fresh water outlet side of my device taken along the lines 4—4 of FIGURE 1.

FIGURE 5 is a schematic of a distillation system which might be used employing several of my solar stills in parallel.

Referring more particularly to the drawings, FIGURE 1 shows a base generally indicated at B in FIGURE 1 to which support members 10 and 12 are affixed by bolts 14. The still assembly generally indicated at S is supported by means of the supply pipes 40 and 42 which project through openings 13 and 15 of supports 10 and 12 respectively. The use of supports such as 10 and 12 is one of a number of such support arrangements that might be used to support the still assembly.

The still assembly S has a clear, non-rigid plastic sheet generally indicated at 20 which is wrapped around end plate members 22 and 24. This plastic may be any one of a number of types of clear plastic which are available in sheet form.

The end plate members 22 and 24 are used to provide a means of shaping the plastic to a desired configuration. End plate 22 is circular and is positioned at the salt water intake adjacent support member 10. The end plate 24 has a circular upper section and an elongated lower section as shown at 26 in FIGURE 4 so that water condensate will flow toward the fresh water spout 28 and thereby be drained from the system without resorting to a special tilting arrangement.

The end plates 22 and 24 are held in fixed position by means of a rigid salt water tray 30 which is preferably made of plastic material and is of generally rectangular shape. End pieces 32 and 34 of this tray abut end plate members 22 and 24 and are held in fixed position against the end pieces by salt water inlet and outlet members 40 and 42.

It should be noted in connection with this arrangement that the salt water tray 30 provides a rigid support for the end plates 22 and 24 and as such provides both the structural frame support for the entire still configuration as well as conveying salt water through the still assembly.

The width of the tray 30 is approximately three quarters the diameter of the template 22. The tray as shown in FIGURE 3 in effect separates the upper and lower halves of the still assembly and in this way acts as a divider to keep the lower section cooler than the upper section. The tray may be made of black, plastic material so that a maximum amount of heat is absorbed to assist in evaporating the salt water in the tray as shown in FIGURE 3.

The salt water supply pipe 40 is affixed to the evaporating tray 30 at 44 by a rigid fastening arrangement such as glue or welding. The position of the inlet pipe 40 with respect to the tray should be noted since the salt water supplied through this pipe is dropped down into the tray. The salt water outlet pipe 42 is inserted through end piece 34 of the tray at a height from the bottom of the tray 38 which will permit drain off of the salt water from the tray.

This arrangement provides for a steady flow of salt water through the tray and prevents rapid accumulation of residue deposits that would ordinarily accrue within the tray if no flow-through system were used. The volume of water passed through the unit would depend upon use and conditions and would be adjusted therefor.

The tray with the integral supply and outlet pipes 40 and 42 form a simple skeletal structure upon which the rest of the unit is built. End templates 22 and 24 have openings therein to accommodate pipe members 40 and 42 respectively and are moved into position in abutting relation with end members 32 and 34 of the salt water tray. This gives a simple strong structural framework for the sheet plastic material 20, which is wrapped around the end templates and fastened in an overlapping relation generally indicated at 21. The plastic sheeting could be either held in position by use of an adhesive or by clamping it in position by use of a fastener.

It should be noted that the sides of the salt water receiving tray 35 and 36 form a slight clearance with respect to the clear plastic material to permit condensate to run down the inside of the plastic sheet without interference from the tray. The clearance is small to also provide a zone below the salt water tray which is somewhat cooler than the area above the tray. This arrangement will facilitate condensation in the unit.

Inasmuch as the end plate 24 has an elongated lower section 26, a tapered sloping lower surface on the still is provided which will enable the condensated vapor to accumulate and run downwardly toward the fresh water outlet spout 28.

The outlet spout 28 is fastened directly to end plate 24 and will enable an additional outlet line to be attached thereto so that fresh water may be drawn from the solar still.

In operation, salt water is supplied through inlet tube 40 to the salt water tray 30 and flows therethrough and out salt water outlet pipe 42. In passing through the still the salt water is heated by radiation received through the plastic covering 20 and evaporated. Vapor then condenses on the inner surface of covering 20 above the tray.

It then flows downward toward the bottom of the inner surface of the plastic sheeting and flows along the sloped lower surface 27 to the fresh water outlet 28.

FIGURE 5 shows an arrangement of 4 solar stills 52, 54, 56, and 58 in parallel arrangement. The salt water supply shown at 60 provides salt water to each of the units through piping assembly 70. A common piping system 80 provides for drainage of the salt water trays of the solar still units. The de-salted water from each solar still is collected in a common piping system generally indicated at 90.

While the invention has been described, it will be understood that it is capable of further modifications and this application is intended to cover any variations, uses, or adaptations of the invention following in general, the principles of the invention and including such departures from the present disclosures as come within known or customary practice in the art to which the invention pertains, and as may be applied to the essential features hereinbefore set forth and as fall within the scope of the invention or the limits of the appended claims.

Having thus described my invention what I claim is:

1. A portable solar still assembly comprising:
    (a) two spaced upright support members,
    (b) an elongated lightweight hollow still chamber disposed between said support members which has a rigid end plate member at each end immediately adjacent its corresponding support member,
    (c) an elongated rigid evaporating tray within said still chamber and integrally connected at each end to said end plate members,
    (d) a continuous plastic sheet material forming the outer wall of said still chamber and having its ends wrapped around said end plate members and spaced from said evaporating tray,
    (e) a rigid salt water inlet pipe extending through and integrally connected to a first end plate to suppply salt water to said evaporating tray,
    (f) a rigid salt water outlet pipe extending through and integrally connected to the other of said end plates for receiving salt water from said evaporating tray,
    (g) each of said pipes having a portion thereof which is supported on its corresponding adjacent upright support member,
    (h) one of said end plate members having an elongated lower section on which the lower portion of the outer wall is supported so that said wall slopes downwardly toward said one end plate member, and
    (i) a condensate outlet pipe at the bottom of said one end plate member through which condensed liquid is withdrawn from said still chamber.

2. A portable solar still assembly as set forth in claim 1 wherein said outer wall is one continuous piece of clear plastic which has its longitudinal edges in overlapping engagement.

3. A portable solar still assembly as set forth in claim 1, wherein said one end plate member is pear-shaped with the narrower section being the lower portion thereof and said outlet pipe is integral with the lowermost edge of said narrower section.

References Cited by the Examiner

UNITED STATES PATENTS 2,843,536   7/58   Mount.
3,006,818   10/61   Lappala et al.

NORMAN YUDKOFF, *Primary Examiner.*